(12) United States Patent
Xu et al.

(10) Patent No.: US 10,607,518 B2
(45) Date of Patent: Mar. 31, 2020

(54) DISPLAY PANEL AND METHOD FOR GENERATING COORDINATES OF RANDOM BLOCK

(71) Applicant: SHANGHAI TIANMA MICRO-ELECTRONICS CO., LTD., Shanghai (CN)

(72) Inventors: Jian Xu, Shanghai (CN); Yaoyang Liu, Shanghai (CN); Jialing Li, Shanghai (CN); Lei Niu, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 116 days.

(21) Appl. No.: 15/831,363

(22) Filed: Dec. 4, 2017

(65) Prior Publication Data
US 2018/0102078 A1    Apr. 12, 2018

(30) Foreign Application Priority Data
Aug. 8, 2017    (CN) .......................... 2017 1 0671281

(51) Int. Cl.
| | | |
|---|---|---|
| G09G 3/00 | (2006.01) | |
| H04N 13/307 | (2018.01) | |
| G09G 3/20 | (2006.01) | |
| G02B 27/00 | (2006.01) | |

(52) U.S. Cl.
CPC ............. G09G 3/003 (2013.01); G09G 3/007 (2013.01); G09G 3/2003 (2013.01); H04N 13/307 (2018.05); G02B 27/0018 (2013.01); G09G 2320/0257 (2013.01)

(58) Field of Classification Search
None
See application file for complete search history.

(56) References Cited

U.S. PATENT DOCUMENTS

| | | | | |
|---|---|---|---|---|
| 4,855,931 A | * | 8/1989 | Saunders ............... | G01N 21/35 703/12 |
| 5,119,235 A | * | 6/1992 | Umeda ................... | G03B 13/24 359/619 |
| 2002/0085287 A1 | * | 7/2002 | Egawa .................... | G02B 3/005 359/619 |
| 2012/0182407 A1 | * | 7/2012 | Yoshida ............. | G02B 27/2214 348/54 |
| 2013/0194482 A1 | * | 8/2013 | Nicol ...................... | G06F 17/50 348/340 |

FOREIGN PATENT DOCUMENTS

CN           105182553 A       12/2015

* cited by examiner

*Primary Examiner* — Christopher R Lamb
(74) *Attorney, Agent, or Firm* — Kilpatrick Townsend & Stockton, LLP

(57) ABSTRACT

The present application provides a display panel. Blocks of the display panel have the characteristic of random arrangement, which can eliminate a ghosting problem caused by periodic arrangement, and the randomness is subjected to some limitations and restrictions, thereby avoiding the wiring difficulty in the related art in which blocks are arranged completely randomly.

17 Claims, 7 Drawing Sheets

DISPLAY PANEL AND METHOD FOR GENERATING COORDINATES OF RANDOM BLOCK

CROSS-REFERENCE TO RELATED APPLICATIONS

The present application claims the benefit of priority to Chinese Patent Application No. 201710671281.7, filed on Aug. 8, 2017, the content of which is incorporated herein by reference in its entirety.

TECHNICAL FIELD

The present application relates to the field of display technologies and, particularly, relates to a display panel and a method for generating coordinates of a random block for a display panel.

BACKGROUND

At present, the display technology is developing towards high definition. A display panel generally includes a plurality of blocks for emitting light for color display. For two-dimensional plane display, one block may be understood as one pixel, or a pixel unit composed of a plurality of pixels, or even a pixel combination formed by regional arrangement of a plurality of pixel units. The blocks are arranged to adapt to different display requirements, thereby achieving different two-dimensional display effects. For a stereoscopic display device, blocks are usually matched with a lens or an optical grating, and are separated to be a left view and a right view by the lens or the optical grating and then observed by a right eye and a left eye of an observer, respectively. As a result, a stereoscopic perception is generated by binocular visual fusion. For a suspended display device, a light exit direction of blocks of a block array is usually changed by respective microlenses to form a suspended image in a certain spatial point. Generally, each block may include a plurality of pixel units, and an image displayed by each block is identical. In the existing suspended display technology, the periodic arrangement of the blocks is likely to cause display ghosting in a display process. If perturbation is applied only on the basis of the periodic structure, the ghosting may be just alleviated rather than eliminated. However, the random arrangement may eliminate the ghosting, but will bring difficulty for wiring design, and therefore, there are great difficulties in implementing this process. In addition, the wiring between adjacent blocks tends to overlap, resulting in a short circuit. The short circuit may be avoided only by deleting the blocks of which the wiring is overlapped, but an aperture ratio may be reduced, such that viewpoints of the resulting suspended image become less and the visual effect of the suspended display is affected.

SUMMARY

In view of this, the present application provides a display panel. Blocks of the display panel have the characteristic of random arrangement, which can eliminate a ghosting problem caused by periodic arrangement. But the randomness is subjected to some limitations and restrictions, thereby avoiding the wiring difficulty of the related art in which blocks are arranged completely randomly.

In one aspect, an embodiment of the present application provides a display panel, a display area, a non-display area, and a plurality of blocks arranged in an array, and the display area is divided into a plurality of closely packed lattices arranged in an array and having a same size and shape, and for any of the closely packed lattices arranged along a straight line within the array, the closely packed lattices from one end of the straight line to the other end of the straight line have coordinates $(x_i, y_i)$ respectively, and i is a positive integer and $1 \le i \le N$. and N is a number of the closely packed lattices on the straight line; the blocks are arranged in the closely packed lattices, one closely packed lattice having at most one block; and the block located in the closely packed lattice having the coordinates $(x_i, y_i)$ has coordinates $(x'_i, y'_i)$, and normalized relative position coordinates of the block are defined as $(\Delta x_i, \Delta y_i)$, and $$\Delta x_i = \frac{x_i - x'_i}{m}, \Delta y_i = \frac{y_i - y'_i}{n},$$

and m and n are lengths of the closely packed lattice on a coordinate axis in an x direction and a y direction, respectively; and a standard deviation is defined as $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}}; \text{ and}$$

$$\overline{\Delta x} = \frac{\sum_{i=1}^{N} \Delta x}{N}, \overline{\Delta y} = \frac{\sum_{i=1}^{N} \Delta y_i}{N};$$

$0.145 \le S_x < 0.382$ and/or $0.145 \le S_y \le 0.382$.

In another aspect, an embodiment of the present application provides a method for generating the coordinates of random blocks, including steps of: generating initial position coordinates of each block of a plurality of blocks located in a predetermined area and having initial positions; and performing following steps on the blocks in sequence: applying position disturbance information to the initial position coordinates of the blocks to form disturbance position coordinates of the blocks, and comparing whether the disturbance position coordinates satisfy a restriction condition; when the disturbance position coordinates satisfy the restriction condition, reserving the disturbance position coordinates; or when the disturbance position coordinates do not satisfy the restriction condition, discarding the disturbance position coordinates.

According to the display panel provided by the embodiment of the present application, the display area may be divided into the closely packed lattices which are arranged periodically. The arrangement of the closely packed lattices has orderliness. Each closely packed lattice has one block at most; however, the coordinates of the block on any of closely packed lattices arranged along a straight line satisfy a random distribution condition: a standard deviation $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}},$$

in which, $$\overline{\Delta x} = \frac{\sum_{i=1}^{N} \Delta x_i}{N}, \overline{\Delta y} = \frac{\sum_{i=1}^{N} \Delta y_i}{N};$$

$0.145 < S_x < 0.382$ and/or $0.145 < S_y < 0.382$.

Since the block satisfies the above random distribution condition, the display ghosting caused by regular and periodic arrangement of the blocks is avoided. However, each block is limited in one closely packed lattice. Since the closely packed lattices are arranged orderly and periodically, wires among the blocks may be distributed orderly with the periodicity of the closely packed lattices, thereby avoiding the wiring difficulty of the related art in which blocks are arranged completely randomly.

The method for generating the coordinates of the random block provided by the embodiment of the present application is used for generating the block position coordinates satisfying the random distribution condition, is simple in generation manner and can be adaptively adjusted in combination with process conditions.

DESCRIPTION OF EMBODIMENTS

Figure 1A:
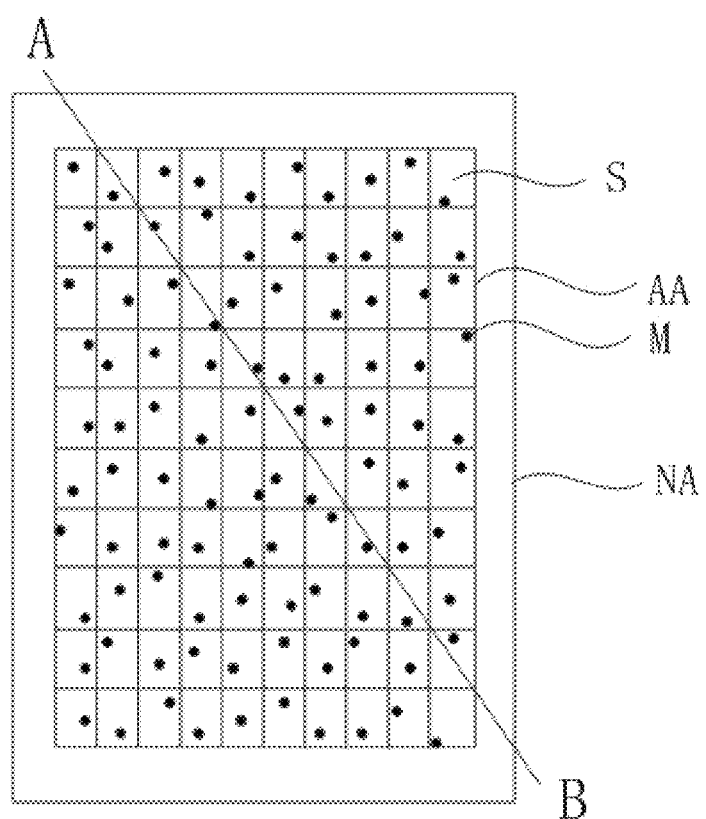
FIG. 1A is a schematic diagram of a display panel provided by an embodiment of the present application.

Since the described technologies take into account various changes and various embodiments, the specific embodiments will be shown in the drawings and described in detail in the written description. The effects and features of the described technologies will now be described more sufficiently with reference to the accompanying drawings in which exemplary embodiments are shown. However, the described technologies may be implemented in many different forms and should not be construed as being limited to the embodiments set forth herein.

Same or corresponding components are denoted by the same reference numerals and are not related to the numbers of the figures. In the full text of the description, when the terms "first" and "second" are used to describe various components, these components are not necessarily limited to the above terms. The above terms are used only to distinguish one component from another.

In the full text of the description, the terms of "comprise" and "include" are used to denote the existence of features and/or components described in the description, without excluding the existence of one or more other features and/or one or more other components. It will be understood that when a layer, a region, a component, etc. are referred to as being "on" another layer, another region or another component, the layer, the region, the component, etc. may be directly on another layer, another region or another component or a middle layer, a middle region or a middle component is present therebetween.

In the drawings, the thicknesses of the layers and regions are exaggerated for clarity. For example, for ease of description, the thicknesses and dimensions of elements in the drawings are shown arbitrarily, and therefore, the technical scope described is not limited by the drawings.

Hereinafter, in one or more exemplary embodiments, an X-axis, a Y-axis and a Z-axis may not be limited to three axes in a rectangular coordinate system, and may be interpreted as a broad meaning including the three axes. For example, the X-axis, the Y-axis, and the Z-axis may be perpendicular to each other or may represent different directions that are not perpendicular to each other.

In addition, it should also be noted that in some alternative implementations, all the steps of the method described herein may not occur in sequence. For example, two successive steps are shown to be performed substantially simultaneously in fact, or the two steps may sometimes be performed in a reverse order.

As used herein, the term "and/or" includes any and all combinations of one or more of the associated listed items.

The expression such as "at least one of . . . ", when located behind an element list, decorates the entire list of elements, rather than the individual element in the list. In the present application, the term "approximately" includes the meaning of a complete, almost complete, or any significant degree under some applications or to those skilled in the art. In addition, "formed, arranged or placed over . . . " may also mean "formed, arranged or placed on . . . ". The term "connection" includes electrical connection.

Hereinafter, the present embodiment will be described in detail with reference to the accompanying drawings.

Figure 1B:
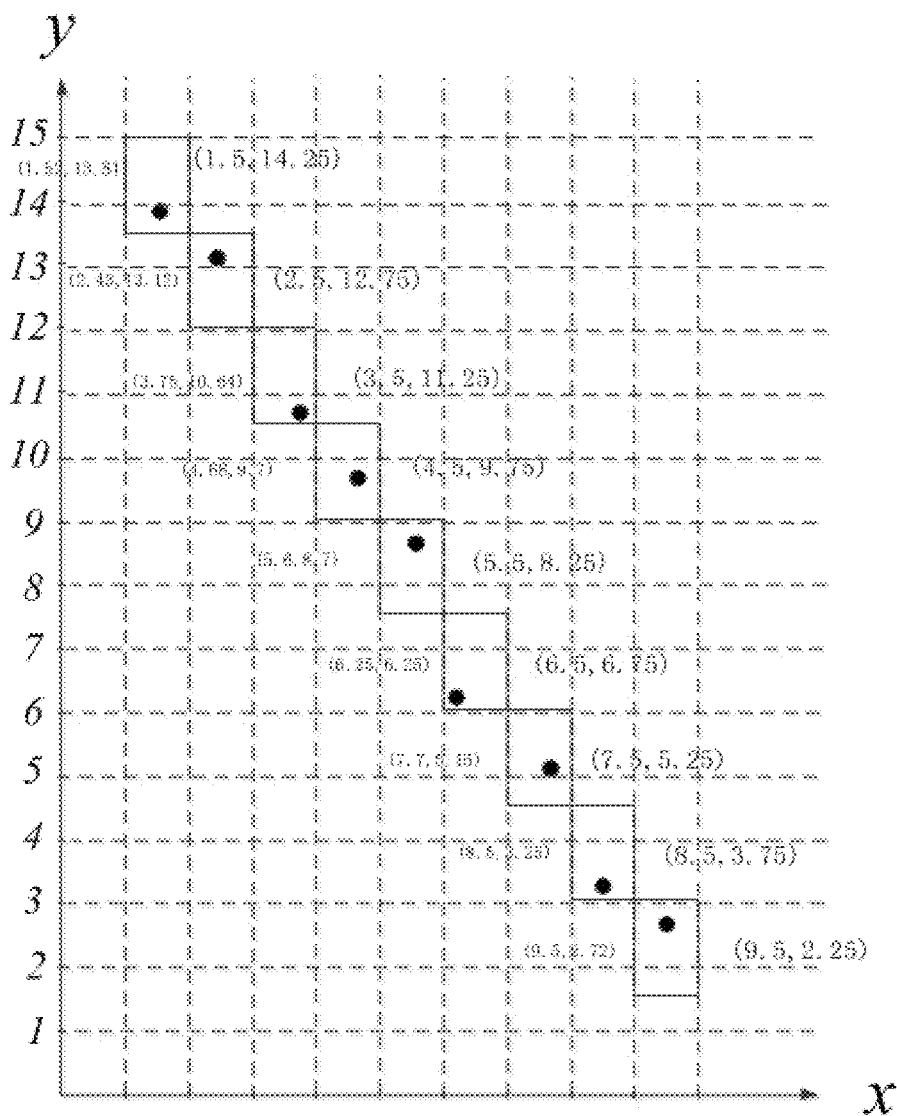
FIG. 1B is a schematic diagram of close-packed lattices and blocks provided by an embodiment of the present application in a rectangular coordinate system.

FIG. 1A is a schematic diagram of a display panel provided by an embodiment of the present application. FIG. 1B is a schematic diagram of coordinates of closely packed lattices and blocks provided by an embodiment of the present application in a rectangular coordinate system. As shown in FIGS. 1A and 1B, the display panel includes a display area AA and a non-display area NA, and a plurality of blocks M arranged in an array. The display area AA is divided into a plurality of closely packed lattices S arranged in an array and having the same size and shape. For any of the closely packed lattices S arranged along a straight line within the close-packed lattice array, the closely packed lattices at one end of the straight line to the closely packed lattices at the other end of the straight line have coordinates $(x_i, y_i)$ respectively, in which i is a positive integer and $1 < i < N$, and N is the number of the closely packed lattices S on the straight line. The blocks M are arranged in the closely packed lattices S, one closely packed lattice S having one block M at most; the block located in the closely packed lattice having the coordinates $(x_i, y_i)$ has coordinates $(x'_i, y'_i)$ and, the normalized relative position coordinates of the block are defined as $(\Delta x_i, \Delta y_i)$, in which, $$\Delta x_i = \frac{x_i - x'_i}{m}, \Delta y_i = \frac{y_i - y'_i}{n},$$

and m and n are the lengths of the closely packed lattice on a coordinate axis in an x direction and a y direction; and a standard deviation is defined as $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}},$$

in which, $$\overline{\Delta x} = \frac{\sum_{i=1}^{N}\Delta x_i}{N}, \overline{\Delta y} = \frac{\sum_{i=1}^{N}\Delta y_i}{N};$$

when the coordinate of the block has no randomness in an x/y direction, the standard deviation is $S_{x/y}=0$; when the coordinates of the blocks are arranged completely randomly in the closely packed lattices, the standard deviation is $S_{x/y}\approx 0.29$. In order to make the blocks have certain randomness to eliminate ghosting, $0.145 \leq S_x \leq 0.382$ and/or $0.145 \leq S_y \leq 0.382$ are/is enabled.

The display panel in the embodiment of the present application may be a liquid crystal display panel, or an organic light emitting diode display panel. The display area AA is used for performing image display. The non-display area NA is arranged around the display area, generally provided with an integrated circuit, a connecting wire and other structures and used for providing a driving signal for the display area. The display area AA may be divided into a plurality of closely packed lattices S arranged in an array having the same shape and size. The closely packed lattices described here refer to that adjacent lattices are closely arranged without gaps. But it should be illustrated that the closely packed lattices here are of an artificial definition and division, rather than an actually existing structure on the display panel. The division manner will not be limited in the present application, and is only necessary to meet the periodic arrangement, the same shape and size and close arraying.

FIG. 1A illustrates rectangular closely packed lattices in a 10*10 arrangement. For any of the closely packed lattices S arranged along a straight line within the close-packed lattice array, a straight line AB is shown in the figure. Referring to FIG. 1B which illustrates coordinates of closely packed lattices on the straight line AB, from the closely packed lattices at one end A of the straight line to the closely packed lattices at the other end B of the straight line, they have the coordinates $(x_1, y_1)$. $(x_2, y_2)$, $(x_3, y_3)$ . . . $(x_9, y_9)$ respectively, a central position coordinate of each closely packed lattice being represented as a coordinate of the close-packed lattice.

The display panel generally includes a plurality of blocks for emitting light for color display. For two-dimensional plane display, one block may be understood as one pixel, or a pixel unit composed of a plurality of pixels, or even a pixel combination formed by regional arrangement of a plurality of pixel units. The blocks are arranged to adapt to different display requirements, thereby achieving different two-dimensional display effects. For a stereoscopic display device, blocks are usually matched with a lens or an optical grating, and are separated to be a left view and a right view by the lens or the optical grating and then observed by a right eye and a left eye of an observer, respectively. As a result, a stereoscopic perception is generated by binocular vision fusion. For a suspended display device, a light exit direction of blocks of a block array is usually changed by respective microlenses to form a suspended image in a certain spatial point. Generally, each block may include a plurality of pixel units, and the image displayed by each block is identical.

In FIG. 1A, a black dot is represented as a block M. The blocks M are arranged in an array, each block M being arranged in one closely packed lattice S. As shown in FIG. 1A, one closely packed lattice S has one block M at most. In an embodiment as shown in FIG. 1A, each closely packed lattice S is set to have and only have one block M. Although the black dot is represented as one block in the drawing, the block is an actually existing structure in the display panel in fact. One block M may be one pixel described previously, or a pixel unit composed of several pixels, or a pixel combination formed by regional arrangement of a plurality of pixel units. As shown in FIG. 1B, the block located in the closely packed lattice having a coordinate $(x_i, y_i)$ has coordinates $(x'_i, y'_i)$, i.e., the blocks in the closely packed lattices having the coordinates $(x_1, y_1)$, $(x_2, y_2)$, $(x_3, y_3)$ . . . $(x_9, y_9)$ have the coordinates $(x'_1, y'_1)$, $(x'_2, y'_2)$, $(x'_3, y'_3)$ . . . $(x'_9, y'_9)$ respectively, a central position coordinate of each block being represented as a coordinate of the block. It should be illustrated that each closely packed lattice on the straight line AB has one block M, which is merely schematic, and a closely packed lattice S without a block M may also exist.

Further referring to FIG. 1B, for an example in which the lengths of each closely packed lattice in an x direction and a y direction is 1 and 1.5 respectively, the coordinates of the closely packed lattices on the straight line AB are (1.5, 14.25), (2.5, 12.75), (3.5,11.25), (4.5, 9.75), (5.5, 8.25), (6.5, 6.75), (7.5, 5.25), (8.5, 3.75), (9.5, 2.25) respectively. Each of the nine closely packed lattices has one block, and the corresponding coordinates of the nine blocks are (1.52, 13.81), (2.43, 13.12), (3.75, 10.64), (4.68, 9.7), (5.6, 8.7), (6.25, 6.25), (7.7, 5.15), (8.5, 3.25), (9.5, 2.72) respectively. The normalized relative position coordinates of each block are defined as $(\Delta x_i, \Delta y_i)$, in which, $$\Delta x_i = \frac{x_i - x'_i}{m}, \Delta y_i = \frac{y_i - y'_i}{n},$$

and m and n are the lengths of each closely packed lattice on a coordinate axis in an x direction and a y direction, respectively. Therefore, the normalized relative position coordinates of the ninth blocks are (−0.02, 0.29), (0.07, −0.25), (−0.25, 0.406), (−0.18, 0.033). (−0.1, −0.3), (0.250, 0.333) (−0.2, 0.067), (0, 0.333), (0, −0.313), and the standard deviation is defined as $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}};$$

in which, $$\overline{\Delta x} = \frac{\sum_{i=1}^{N} \Delta x_i}{N} \text{ and } \overline{\Delta y} = \frac{\sum_{i=1}^{N} \Delta y_i}{N};$$

upon calculation, $$\overline{\Delta x} = \frac{-0.02 + 0.07 - 0.25 - 0.18 - 0.1 + 0.25 - 0.2}{9} = -0.048;$$

$$\overline{\Delta y} = \frac{0.29 - 0.25 + 0.406 + 0.033 - 0.3 + 0.333 + 0.067 + 0.333 - 0.313}{9};$$

$S_x=0.146$, $S_y=0.276$, and therefore, $S_x$ and $S_y$ satisfy $0.145 \leq S_x \leq 0.382$ and $0.145 \leq S_y \leq 0.382$.

According to the embodiment of the present application, the display panel is divided into the regularly arranged closely packed lattices, and each block is located inside each closely packed lattice to macroscopically keep the blocks be ordered to a certain degree, i.e., the arrangement manner of the blocks is subjected to certain principle, thereby ensuring regular wiring between the adjacent blocks and also reducing the wiring difficulty of the blocks. In addition, the normalized relative position coordinate of the block in any of the closely packed lattices arranged in a straight line satisfies a standard deviation condition, such that the block satisfies disorder of a certain degree, and the regular and periodic arrangement of the blocks in the related art is avoided. Therefore, the problems of ghosting, image visibility and the like caused by the regular and periodic arrangement are solved. It can be understood that the standard deviation can measure the discrete degree. The worse the discrete degree, the stronger the regularity, the closer the standard deviation value approaches 0; the higher the disorder, the closer the standard deviation value approaches 0.29. According to the display panel provided by the embodiment of the present application, a standard deviation of the normalized relative position coordinate of each block satisfies $0.145 \leq S_x \leq 0.382$ and/or $0.145 \leq S_y \leq 0.382$, and each block is limited inside one closely packed lattice, such that the block satisfies certain disordered distribution. Therefore, the ghosting problem of the regularly distributed blocks is solved on one hand, and on the other hand, the wiring design is simple, the wiring is easy to perform, and the process difficulty of the randomly arranged blocks is greatly reduced.

Figure 2A:
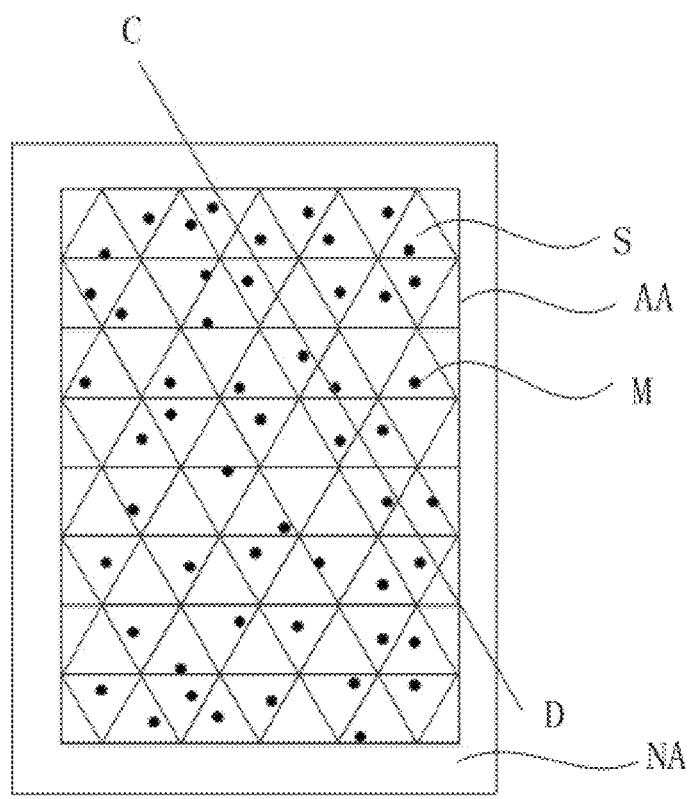
FIG. 2A is a schematic diagram of a division manner of closely packed lattices provided by an embodiment of the present application.
Figure 2B:
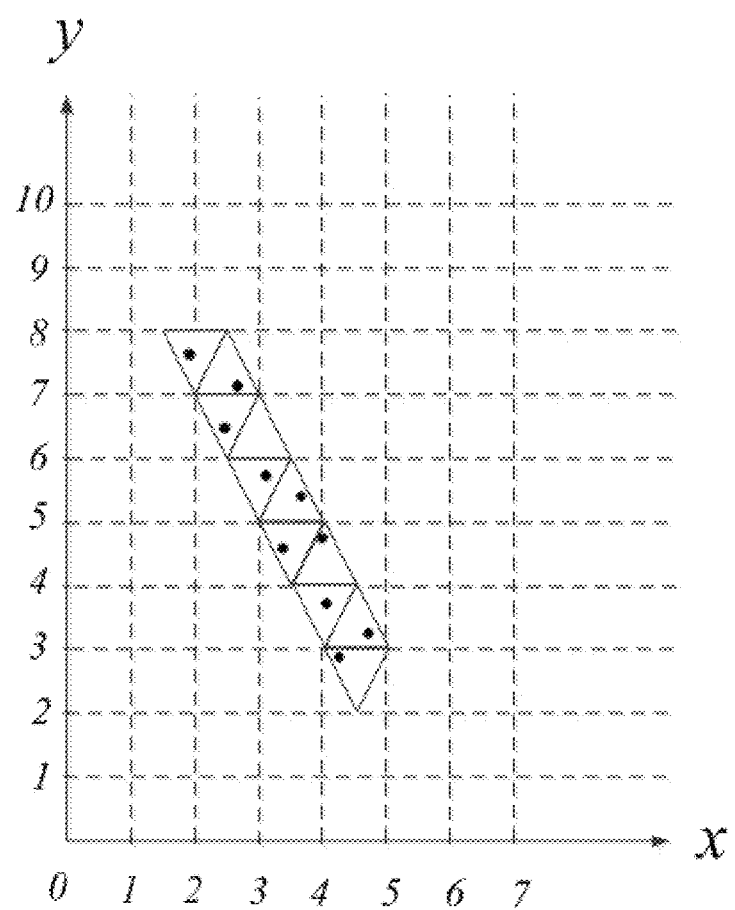
FIG. 2B is a schematic diagram of coordinates of close-packed lattices and blocks on a straight line CD in FIG. 2A in a rectangular coordinate system.

FIG. 1A schematically provides that the closely packed lattices are arrayed in rows and columns, the row direction being perpendicular to the column direction. The division manner of the closely packed lattices of which rows and columns are mutually perpendicular can simplify the calculation of positions of coordinates of the blocks. Of course, the division manner of the closely packed lattices is not unique. FIG. 2A is a schematic diagram of a division manner of close-packed lattices provided by an embodiment of the present application. FIG. 2B is a schematic diagram of closely packed lattices and blocks on a straight line CD in a rectangular coordinate system in FIG. 2A. As shown in FIGS. 2A to 2B, each closely packed lattice has a shape of a triangle, and the coordinate of the close-packed lattice is a coordinate of a central position of the closely packed lattice. In FIG. 2A, on the straight line CD, eleven triangular closely packed lattices are arranged in sequence. For an example in which the lengths of each triangular closely packed lattice in an x direction and a y direction are 1 respectively, a base and a height of the triangle are 1 respectively, then on the straight line CD, position coordinates of the eleven closely packed lattices can be obtained accordingly. In the present embodiment, there is no block in the fourth closely packed lattice on the straight line CD, and therefore, it is unnecessary to calculate the coordinate of the fourth block. When the standard deviation of the normalized relative position coordinate of the block is calculated, the total number N of the blocks is still calculated as 11. In an embodiment of the present application, within a display area of the display panel, a ratio of the number of the blocks to the number of the closely packed lattices is larger than 0.9. That is, it is assumed that 90 blocks are distributed, the display panel is divided into 100 closely packed lattices at most, which satisfies various conditions in the above embodiment of the present application.

Figure 3:
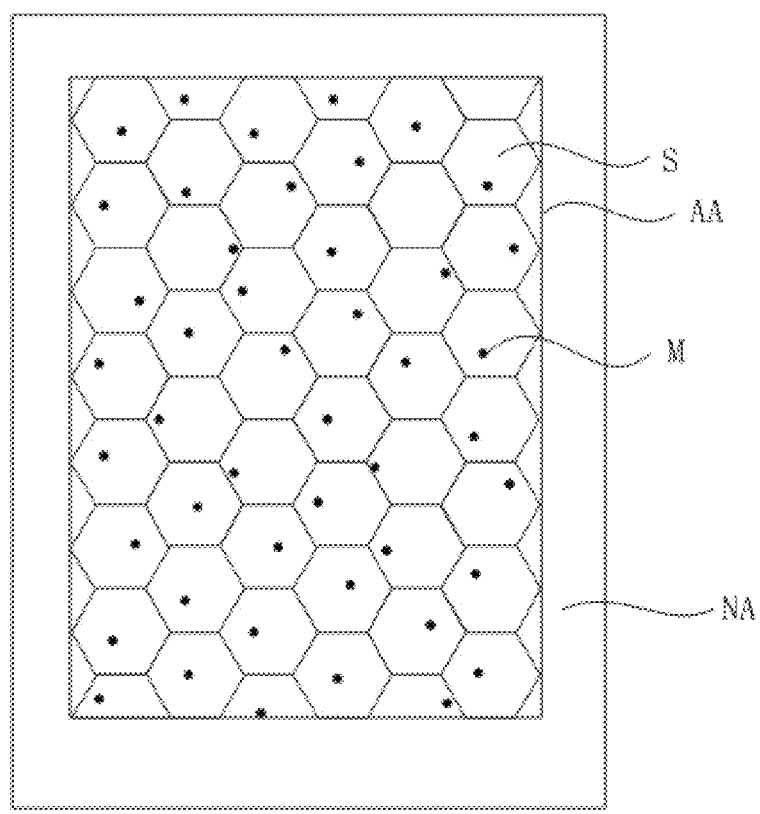
FIG. 3 is a schematic diagram of another division manner of closely packed lattices provided by an embodiment of the present application.

FIG. 3 is a schematic diagram of another division manner of the closely packed lattices provided by an embodiment of the present application, each closely packed lattice having a shape of a polygon, and a hexagon is illustrated in the drawing. It may be understood that the closely packed lattices are arranged regularly according to certain rules. In order to realize image display of the display panel, the blocks are electrically connected through wires. The regularly arranged closely packed lattices can cause that the wiring manner of the wires be in conformity with certain rules, thereby reducing the wiring difficulty of the wires. The wiring manner of the wires is always related to the shape and the arrangement manner of the closely packed lattices. The rectangular, triangular and polygonal closely packed lattices have higher arrangement orderliness, thereby simplifying the wiring.

As described above, for two-dimensional plane display, one block can be understood as one pixel, or a pixel unit composed of a plurality of pixels, or even a pixel combination formed by regional arrangement of a plurality of pixel units. The blocks are arranged to adapt to different display requirements, thereby achieving different two-dimensional display effects. For a stereoscopic display device, blocks are usually matched with a lens or an optical grating, and are separated to be a left view and a right view by the lens or the optical grating and then observed by a right eye and a left eye of an observer, respectively. As a result, a stereoscopic perception is generated by binocular vision fusion. The structure of the blocks provided by the embodiment of the present application will now be described by taking a suspended display panel as an example.

Figure 4A:
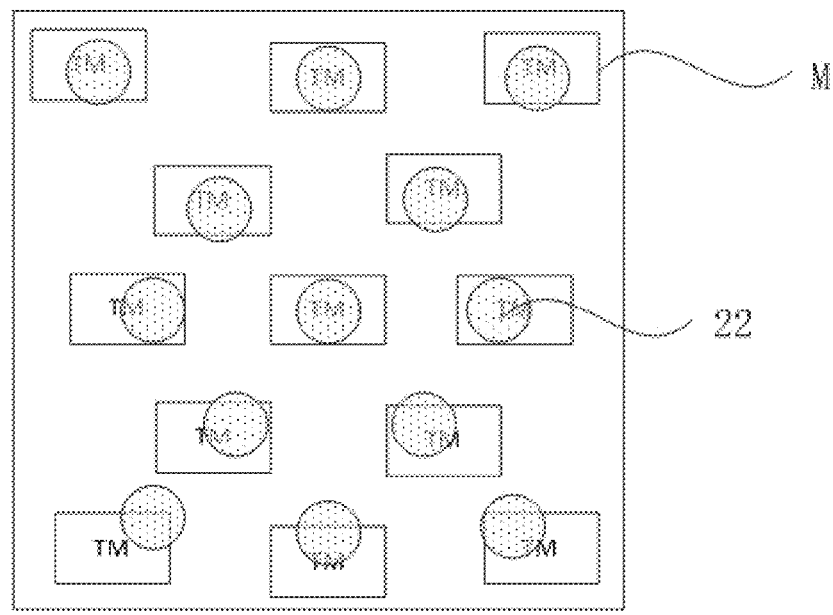
FIG. 4A is a schematic diagram of a suspended display panel provided by an embodiment of the present application.

FIG. 4A is a schematic diagram of the suspended display panel provided by an embodiment of the present application. The display panel has a plurality of arrayed blocks M, each block M generally including a plurality of pixels. One pixel is a minimum display module. The pixels usually have three colors, namely red, green and blue (three primary colors). Each pixel is driven by a pixel circuit and can be displayed independently. When an image is displayed, a gate driver drives a corresponding pixel switch to be turned on, and a display data signal is transmitted into the pixel to realize the display. One block in the embodiment of the present application may realize the display of an image, and different blocks display the same image. Each block corresponds to a microlens 22. Since the microlens 22 has a surrounding viewing angle of 360 degrees, a reference image displayed by each block may be refracted by the microlens 22 and then synthesized into a suspended pattern in a space of the display device towards a user.

Figure 4B:
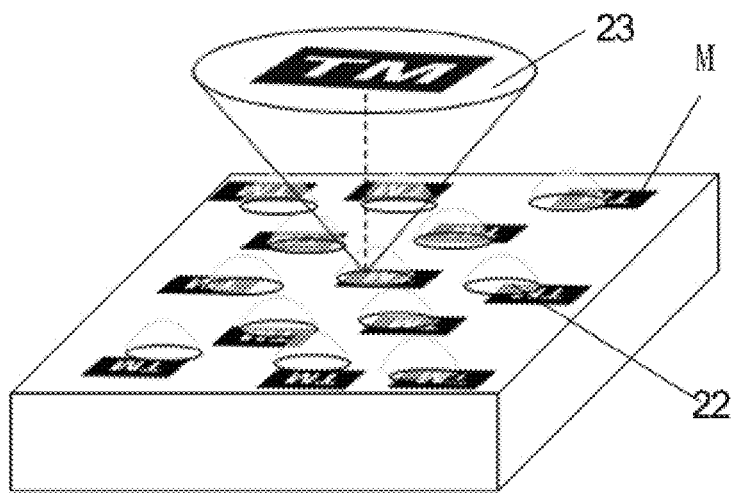
FIG. 4B is a schematic diagram of suspended display provided by an embodiment of the present application.

FIG. 4B is a schematic diagram of suspended display provided by an embodiment of the present application. Referring to FIG. 4B, each block displays the same reference image TM. The suspended image 23 is formed at a side of an observer by means of the refraction of the microlens 22. For the suspended display panel, if the blocks are arranged according to periodic rules, obvious ghosting may be generated by a suspended image synthesized by the microlens. According to the embodiment of the present application, the display area of the display panel is divided into a plurality of closely packed lattices S arranged in an array and having the same size and shape. For any of the closely packed lattices S arranged along a straight line within the closely packed lattice array, from the closely packed lattices at one end of the straight line to the closely packed lattices at the other end of the straight line, they have coordinates $(x_i, y_i)$ respectively, in which i is a positive integer and $1<i\leq N$, and N is the number of the closely packed lattices on the straight line. A plurality of arrayed blocks M is arranged in the closely packed lattices S, one closely packed lattice S having one block M at most. The block located in the closely packed lattice having the coordinates $(x_i, y_i)$ has coordinates $(x'_i, y'_i)$ and the normalized relative position coordinates of the block are defined as $(\Delta x_i, \Delta y_i)$, in which, $$\Delta x_i = \frac{x_i - x'_i}{m}, \Delta y_i = \frac{y_i - y'_i}{n},$$

and m and n are the lengths of the closely packed lattice on a coordinate axis in an x direction and a y direction, respectively; and a standard deviation is defined as $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}};$$

in which, $$\overline{\Delta x} = \frac{\sum_{i=1}^{N}\Delta x_i}{N}, \overline{\Delta y} = \frac{\sum_{i=1}^{N}\Delta y_i}{N}.$$

When the coordinate of the block has no randomness in an x/y direction, the standard deviation is $S_{x/y}=0$; when the coordinates of the blocks are arranged completely randomly in closely packed lattices, the standard deviation is $S_{x/y}\approx 0.29$. In order to ensure that the blocks have certain randomness to eliminate the ghosting, the above structure may have the following features: $0.145 \leq S_x \leq 0.382$ and/or $0.145 \leq S_y \leq 0.382$. By means of the above arrangement manner, the blocks of the suspended display panel have higher random distributivity, and the position of each block is limited by the closely packed lattice, such that the problem of suspended display ghosting is solved on the one hand, and the wiring difficulty of highly randomly distributed blocks is solved on the other hand.

Although one dot is represented as one block in FIGS. 1 to 3, but this is merely schematic. In the actual display panel, each block has a certain area (for example, as shown in FIGS. 4A and 4B). If the division area of each closely packed lattice is S1, and the area of each block is S2, then S1 and S2 need to satisfy $S1 \geq 1.8 \times S2$. That is, the area of one closely packed lattice is at least 1.8 times larger than the area of one block. The larger a ratio of the area of the closely packed lattice to the area of the block, the larger the possibility of higher distribution randomness of the blocks. A larger ratio of the area of the closely packed lattice and the area of the block provides a higher accommodation space for the block position change.

The present application further provides a method for generating coordinates of a random block. The block distribution in above embodiment can be obtained by the method provided by the present embodiment of the present application. The method provided by the present embodiment includes the following steps: generating initial position coordinates of each block among a plurality of blocks which is located in a predetermined area and has initial positions; and executing the following steps in sequence to the blocks: applying position disturbance information to the initial position coordinates of the block to form disturbance position coordinates of the block, and comparing whether the disturbance position coordinates satisfy a restriction condition; when the disturbance position coordinates satisfy the restriction condition, reserving the disturbance position coordinates; and when the disturbance position coordinates do not satisfy the restriction condition, discarding the disturbance position coordinates.

Figure 5:
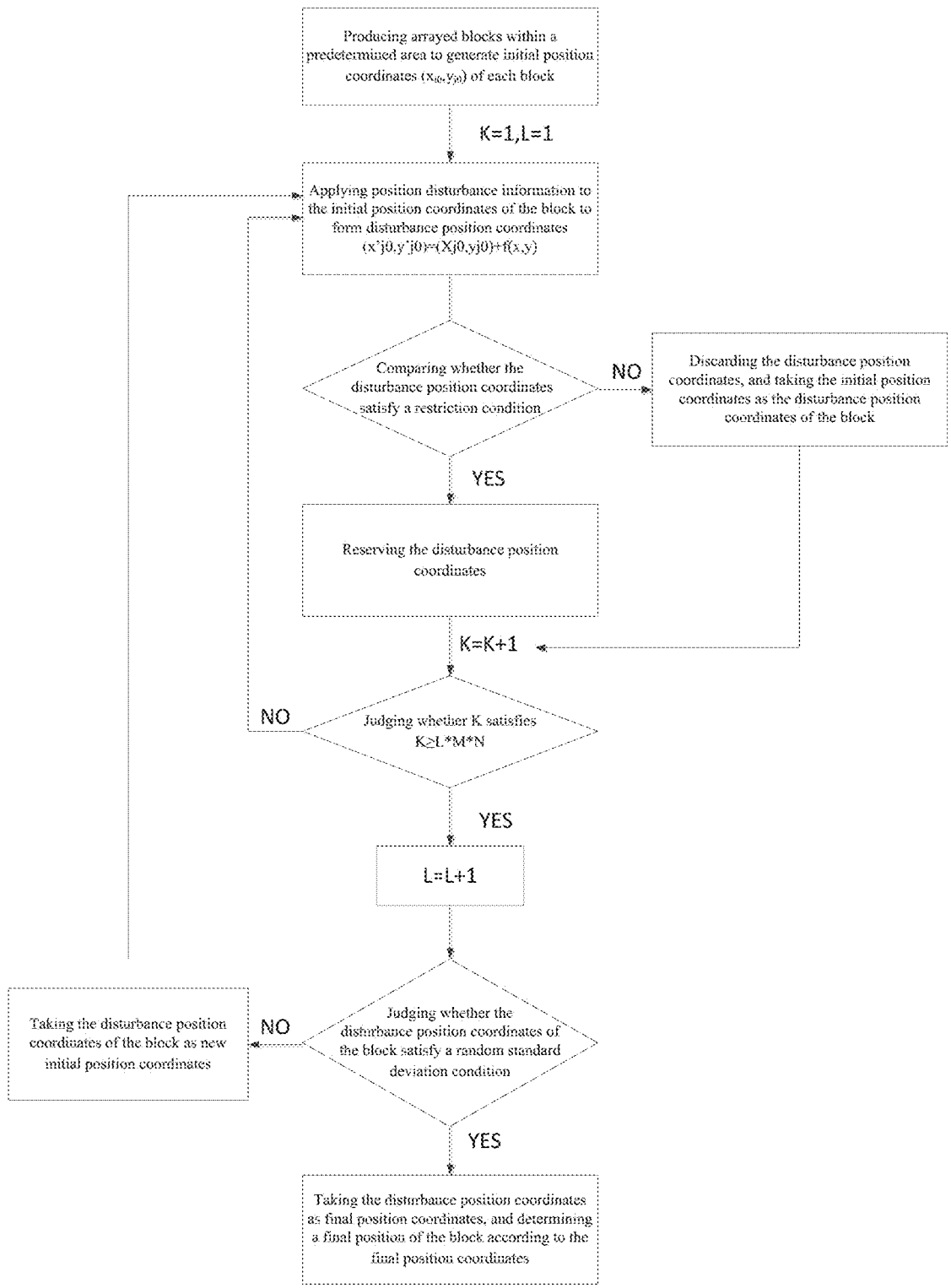
FIG. 5 is a schematic flowchart of a method for generating coordinates of a random block provided by an embodiment of the present application.

FIG. 5 is a schematic flowchart of a method for generating coordinates of a random block provided by an embodiment of the present application. As shown in FIG. 5, a predetermined area may be a display area of the display panel, the display area having blocks having initial positions. First, an initial position coordinate of each block is generated. The initial positions of the blocks here may be arrayed regularly and periodically, for example M*N blocks may be arrayed in M rows and N columns, and the row direction may be perpendicular to the column direction, then each bock has the initial position coordinate $(x_{i0}, y_{j0})$, in which i and j satisfy $1 \leq i \leq M$, $1 \leq j \leq N$ respectively. After the initial position coordinate of each block is generated, the following steps may be executed for each block in sequence, and k=1, L=1 are recorded prior to performing the following steps on each block.

S1: position disturbance information is applied to the initial position coordinate $(x_{i0}, y_{j0})$ of the block to form a disturbance position coordinate $(x'_{i0}, y'_{j0})$ of the block.

Here, the position disturbance information is represented with a function $f(x, y)$, i.e., an offset disturbance of a position is applied to the initial position coordinate of each block, such that the disturbance position coordinate is different from the initial position coordinate, that is:

$$(x'_{i0}, y'_{j0}) = (x_{i0}, y_{j0}) + f(x, y).$$

In one embodiment, a position disturbance information function. $f(x, y)$ may be a random function $rand(\Delta x, \Delta y)$, in which $\Delta x$ and $\Delta y$ represent maximum position changes of the block in the rectangular coordinate system. The random function has better randomness to the disturbance of the initial position coordinate of each block. At this moment:

$$(x'_{i0}, y'_{j0}) = (x_{i0}, y_{j0}) + rand(\Delta x, \Delta y);$$

S2: whether the disturbance position coordinate satisfies a restriction condition is compared.

By applying the restriction condition to the generated disturbance position coordinate, the conditional random block coordinate distribution can be obtained. The restriction condition here may be a restriction to the position of the block, or may be a process condition set for satisfying the production requirements, for example, adjacent blocks are not overlapped, and a minimum spacing is present between the adjacent blocks in order to satisfy the wiring requirement, etc. When the disturbance position coordinate satisfies the restriction condition, the position of the block is determined according to the disturbance position coordinate satisfying the restriction condition. If the disturbance position coordinate does not satisfy the restriction condition, the disturbance position coordinate is discarded; the initial position coordinate is taken as the disturbance position coordinate of the block, K=K+1 is recorded at this moment, and whether K satisfies K≥M*N is judged; if K does not satisfy K≥M*N, it returns to the step S1 and begins to perform the above adjustment on the next block, until the M*N blocks in the display panel are completely subject to the above steps at least once. According to the method for generating the coordinates of the random block provided by the embodiment of the present application, the block distribution having higher random distributivity can be obtained, and all the wiring rules between the adjacent blocks are kept under certain randomness by adding the restriction condition in the adjustment process.

In one embodiment, the predetermined area containing the blocks may be divided into a plurality of closely packed lattices arranged in an array and having the same shape and area. The restriction condition may include: the disturbance position coordinate of each block is located in the closely packed lattice, and the closely packed lattice has one module only. The position disturbance amplitude of each block from the random function can be limited by means of the restriction condition. When the disturbance exceeding the restriction condition appears, the disturbance position coordinate is discarded, and the next block continues to be subject to disturbance, thereby performing the restriction of a certain degree to the distribution of the blocks. The closely packed lattices described here refer that adjacent lattices are arranged closely without gaps. But it should be illustrated that the closely packed lattices here are of an artificial definition and division, rather than an actually existing structure on the display panel. The division manner will not be limited in the present application, and is only necessary to meet the array arrangement, the same shape and size and close arraying. It should be noted that where the block is located in the closely packed lattice means that the coordinate of the central position of the block is located inside the closely packed lattice.

Here, the shape of the closely packed lattice may be a rectangle, a triangle, and a polygon as shown in FIGS. 1A, 2A, and 3, respectively. Regardless of the rectangular, triangular or polygonal closely packed lattice, each closely packed lattice has a corresponding coordinate value in a rectangular coordinate system. The coordinate of the closely packed lattice refers to a coordinate in a central position of a closely packed lattice pattern, and the initial position coordinate and the disturbance position coordinate of each block may also be regarded as coordinate values in the rectangular coordinate system. The initial position coordinate of the block in the step S1 may be the same as a central coordinate of the closely packed lattice in which the block is located, that is, the blocks are given with an initial state of regular arrangement, and it can be preset that one block is located in one closely packed lattice, thereby reducing the deviation between the block distribution at the initial state and the restriction condition, reducing the adjustment load and decreasing the adjustment times.

In one embodiment, continuing to FIG. 5, when K satisfies K≥L*M*N, the adjustment times is calculated as L, and L=L+1 is recorded, and the meaning represented by L is as follows: when L*M*N≤K<(L+1)*M*N, that is, all the M*N blocks are subject to the adjustment for L times, and the $(L+1)^{th}$ adjustment is being executed. The embodiment of the present application may further include:

S3: after all the M*N blocks are subject to the adjustment once, whether the disturbance position coordinates of the block satisfy a random standard deviation condition is judged; when the disturbance position coordinates of the block satisfy the random standard deviation condition, the adjustment is stopped, the disturbance position coordinate of the block is taken as a final position coordinate, and a final position of the block is determined according to the final position coordinate. Here, the random standard deviation condition may be set. In one embodiment, the random standard deviation condition may be as follows: for any of the closely packed lattices arranged along a straight line, from the closely packed lattices at one end of the straight line to the closely packed lattices at the other end of the straight line, they have coordinates $(x_i, y_i)$ respectively, in which i is a positive integer and 1<i≤N, and N is the number of the closely packed lattices on the straight line; the block located in the closely packed lattice having the coordinate $(x_i, y_i)$ has disturbance position coordinates $(x'_i, y'_i)$, and the normalized relative position coordinates of the block are defined as $(\Delta x_i, \Delta y_i)$, in which, $$\overline{\Delta x} = \frac{\sum_{i=1}^{N} \Delta x_i}{N}, \overline{\Delta y} = \frac{\sum_{i=1}^{N} \Delta y_i}{N},$$

and m and n are the lengths of the closely packed lattice on a coordinate axis in an x direction and a y direction, respectively; and a standard deviation is defined as $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}},$$

in which, $$\overline{\Delta x} = \frac{\sum_{i=1}^{N} \Delta x_i}{N}, \overline{\Delta y} = \frac{\sum_{i=1}^{N} \Delta y_i}{N}.$$

The standard deviation satisfies $S_{x0} \leq S_x \leq S_{x1}$ and/or $S_{y0} \leq S_y \leq S_{y1}$, in which, $0.145 \leq S_{x0} \leq S_{x1} \leq 0.382$ and/or $0.145 \leq S_{y0} \leq S_{y1} \leq 0.382$. After the M*N blocks are subject to the adjustment once, the block on the closely packed lattices arranged on a straight line is selected arbitrarily; the coordinate of the closely packed lattice coordinate on the straight line and the disturbance position coordinate of the block are recorded respectively; a normalized relative position coordinate of the block is calculated according to the coordinate of the closely packed lattice and the disturbance position coordinate of the block; a standard deviation of the normalized relative position coordinate of the block is calculated; whether the standard deviation satisfies $S_{x0} \leq S_x \leq S_{x1}$ and/or $S_{y0} \leq S_y \leq S_{y1}$, in which, $0.145 \leq S_{x0} \leq S_{x1} \leq 0.382$ and/or $0.145 \leq S_{y0} \leq S_{y1} \leq 0.382$. The closer $S_x$ and $S_y$ approach to 0.29, the higher the arrangement randomness of the blocks.

When the disturbance position coordinates of the block do not satisfy the random standard deviation condition, the disturbance position coordinates of all the blocks are taken as new initial position coordinates. The adjustment in the steps S1 to S3 is repeated, the determination whether the random standard deviation condition, after the adjustment is completed, is satisfied may be performed to decide whether to perform next adjustment. When the disturbance position coordinates of the block satisfy the random standard deviation condition, the adjustment is stopped, the disturbance position coordinate of the block, which satisfies the random standard deviation condition, is taken as a final position coordinate, and a final position of the block is determined according to the final position coordinate. In this case, the desired distribution of the positions of the blocks can be obtained.

In one embodiment, the determination of step S3 may be performed after each adjustment is completed. In order to obtain better random distribution of the blocks, it is possible to perform the randomness determination after L times of adjustment are completed. For example, all the M*N blocks are subject to the adjustment for L times, and when L≥g times, the determination of step S3 is started for each adjustment. The value of g can be determined according to the randomness requirement, and the higher the randomness requirement, the larger the value of g.

According to the method for generating the coordinates of the random block provided by the embodiment of the present application, the block distribution satisfying the randomness requirement can be adjusted and obtained by applying the disturbance function to the initial position coordinates of the block and limiting the restriction condition. The use of the method to a block distribution design of the display panel can ensure regular wiring between adjacent blocks and reduce the wiring difficulty of the blocks. In addition, the blocks satisfy disorder of a certain degree, and the regular and periodic arrangement of the blocks in the related art is avoided. Therefore, the problems of ghosting, image visibility and the like caused by the regular and periodic arrangement are solved, and the aperture ratio of the display panel is increased. The adjustment manner is simple, which saves the time and labor cost and thus has high adjustment precision compared with the manual investigation of the related art, and can satisfy the arrangement requirements of a plurality of random blocks.

The foregoing description shows and describes a plurality of embodiments of the present application. However, as described previously, it should be understood that the present application may not limited to the forms disclosed herein, should not be construed as an exclusion of other embodiments, and may be used in various other combinations, modifications and environments and can be modified within the scope of the present application as described herein by the teachings or techniques or knowledge of the related art. Changes and modifications made by those skilled in the art without departing from the spirit and scope of the application should fall within the scope of the appended claims.

What is claimed is:

1. A display panel, comprising:
a display area,
a non-display area, and
a plurality of blocks arranged in an array,
wherein the display area is divided into a plurality of closely packed lattices arranged in an array and having a same size and shape, and for any of the closely packed lattices arranged along a straight line within the array, the closely packed lattices from one end of the straight line to the other end of the straight line have coordinates $(x_i, y_i)$ respectively, wherein i is a positive integer and $1 < i \leq N$, and N is a number of the closely packed lattices on the straight line;
the blocks are arranged in the closely packed lattices, one closely packed lattice having at most one block; and
the block located in the closely packed lattice having the coordinates $(x_i, y_i)$ has coordinates $(x'_i, y'_i)$, and normalized relative position coordinates of the block are defined as $(\Delta x_i, \Delta y_i)$, wherein $$\Delta x_i = \frac{x_i - x'_i}{m}, \Delta y_i = \frac{y_i - y'_i}{n},$$

and m and n are lengths of the closely packed lattice on a coordinate axis in an x direction and a y direction, respectively; and a standard deviation is defined as $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}};$$

wherein $$\overline{\Delta x} = \frac{\sum_{i=1}^{N} \Delta x_i}{N}, \overline{\Delta y} = \frac{\sum_{i=1}^{N} \Delta y_i}{N};$$

$0.145 \leq S_x \leq 0.382$ and/or $0.145 \leq S_y \leq 0.382$.

2. The display panel according to claim 1, wherein the closely packed lattices are arranged in rows and columns, a row direction being perpendicular to a column direction.

3. The display panel according to claim 1, wherein each of the closely packed lattices is in a triangular, rectangular or polygonal shape.

4. The display panel according to claim 1, wherein each of the closely packed lattices has an area of S1, and each of the blocks has an area of S2, S1 and S2 satisfying S1≥1.8× S2.

5. The display panel according to claim 1, wherein each of the blocks comprises a plurality of pixels, and the plurality of blocks displays a same image.

6. The display panel according to claim 5, wherein the blocks have microlenses which are arranged in one-to-one correspondence to the blocks.

7. The display panel according to claim 1, wherein a ratio of a number of the blocks to the number of the closely packed lattices is greater than or equal to 0.9.

8. The display panel according to claim 7, wherein each closely packed lattice has and only has one block.

9. A method for generating coordinates of random blocks, applied to a display panel, wherein the display panel comprises:
- a display area,
- a non-display area, and
- a plurality of blocks arranged in an array,
- wherein the display area is divided into a plurality of closely packed lattices arranged in an array and having a same size and shape, and for any of the closely packed lattices arranged along a straight line within the array, the closely packed lattices from one end of the straight line to the other end of the straight line have coordinates $(x_i, y_i)$ respectively, wherein i is a positive integer and $1 < i \leq N$, and N is a number of the closely packed lattices on the straight line;
- the blocks are arranged in the closely packed lattices, one closely packed lattice having at most one block; and
- the block located in the closely packed lattice having the coordinates $(x_i, y_i)$ has coordinates $(x'_i, y'_i)$, and normalized relative position coordinates of the block are defined as $(\Delta x_i, \Delta y_i)$, wherein $$\Delta x_i = \frac{x_i - x'_i}{m}, \Delta y_i = \frac{y_i - y'_i}{n},$$

and m and n are lengths of the closely packed lattice on a coordinate axis in an x direction and a y direction, respectively; and a standard deviation is defined as $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}};$$

wherein $$\overline{\Delta x} = \frac{\sum_{i=1}^{N} \Delta x_i}{N}, \overline{\Delta y} = \frac{\sum_{i=1}^{N} \Delta y_i}{N};$$

$0.145 \leq S_x \leq 0.382$ and/or $0.145 \leq S_y \leq 0.382$,
wherein the coordinates $(x'_i, y'_i)$ are generated by the method, and the method comprises steps of:
generating initial position coordinates of each block of the plurality of blocks arranged in the closely packed lattices and having initial positions; and performing following steps on the blocks in sequence:
applying position disturbance information to the initial position coordinates of the blocks to form disturbance position coordinates of the blocks, and comparing whether the disturbance position coordinates satisfy a restriction condition;
when the disturbance position coordinates satisfy the restriction condition, reserving the disturbance position coordinates as the coordinates $(x'_i, y'_i)$; or
when the disturbance position coordinates do not satisfy the restriction condition, discarding the disturbance position coordinates.

10. The method for generating coordinates of random blocks according to claim 9, wherein a process of executing the steps of claim 9 once for all the blocks is called as primary adjustment, and judging whether the disturbance position coordinates of the blocks satisfy a random standard deviation condition after the primary adjustment is executed;
when the disturbance position coordinates of the blocks satisfy the random standard deviation condition, stopping the adjustment, taking the disturbance position coordinates of the block as final position coordinates, and determining final positions of the blocks according to the final position coordinates; or
when the disturbance position coordinates of the blocks do no satisfy the random standard deviation condition, repeatedly executing a next adjustment.

11. The method for generating coordinates of random blocks according to claim 9, wherein the initial position coordinates, the disturbance position coordinates and the final position coordinates are coordinates in a rectangular coordinate system.

12. The method for generating coordinates of random blocks according to claim 9, wherein the position disturbance information is a random function $\text{rand}(\Delta x, \Delta y)$, wherein $\Delta x$ and $\Delta y$ represent maximum position changes of the blocks in a rectangular coordinate system.

13. The method for generating coordinates of random blocks according to claim 9, wherein the blocks at the initial positions are arranged in an array.

14. The method for generating coordinates of random blocks according to claim 13, wherein the predetermined area is divided into a plurality of closely packed lattices arranged in an array and having a same shape and area;
the restriction condition comprises, but is not limited to:
the disturbance position coordinates of the block are located in the closely packed lattice, and the closely packed lattice has one block only.

15. The method for generating coordinates of random blocks according to claim 14, wherein the initial position coordinates of the block are identical to central coordinates of the closely packed lattice wherein the block is located.

16. The method for generating coordinates of random blocks according to claim 14, wherein the random standard deviation condition is:
for any of the closely packed lattices arranged along a straight line within the array, the closely packed lattices from one end of the straight line to the other end of the straight line have coordinates $(x_i, y_i)$ respectively, wherein i is a positive integer and $1 < i \leq N$, and N is the number of the closely packed lattices on the straight line; and
the block located in the closely packed lattice having the coordinates $(x_i, y_i)$ has coordinates $(x'_i, y'_i)$ and the normalized relative position coordinates of the block are defined as $(\Delta x_i, \Delta y_i)$, wherein $$\Delta x_i = \frac{x_i - x'_i}{m}, \Delta y_i = \frac{y_i - y'_i}{n},$$

and m and n are lengths of the closely packed lattice on a coordinate axis in an x direction and a y direction, respectively; and
a standard deviation is defined as $$S_x = \sqrt{\frac{\sum_{i=1}^{N}(\Delta x_i - \overline{\Delta x})^2}{N}}, S_y = \sqrt{\frac{\sum_{i=1}^{N}(\Delta y_i - \overline{\Delta y})^2}{N}};$$

wherein $$\overline{\Delta x} = \frac{\sum_{i=1}^{N} \Delta x_i}{N}, \overline{\Delta y} = \frac{\sum_{i=1}^{N} \Delta y_i}{N};$$

$S_{x0} \leq S_x \leq S_{x1}$ and/or $S_{y0} \leq S_y \leq S_{y1}$ are/is satisfied, wherein $0.145 \leq S \leq 0.382$, $0.145 \leq S_y \leq 0.382$.

17. The method for generating coordinates of random blocks according to claim 14, wherein each of the closely packed lattices is in a shape of one of a rectangle, a triangle and a polygon.

* * * * *